(12) United States Patent
Lang

(10) Patent No.: US 7,143,888 B2
(45) Date of Patent: Dec. 5, 2006

(54) COMBINED NO-BACK AND TORQUE LIMITER

(75) Inventor: David J. Lang, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 113 days.

(21) Appl. No.: 11/043,487

(22) Filed: Jan. 26, 2005

(65) Prior Publication Data
US 2006/0163026 A1 Jul. 27, 2006

(51) Int. Cl.
F16D 67/00 (2006.01)
(52) U.S. Cl. .................. 192/223.3; 74/89.16; 188/134
(58) Field of Classification Search ............. None
See application file for complete search history.

(56) References Cited

U.S. PATENT DOCUMENTS

| 4,483,429 A | * | 11/1984 | Tiedeman | 192/223.3 |
| 4,697,672 A | * | 10/1987 | Linton | 188/134 |
| 4,850,458 A | * | 7/1989 | Allan et al. | 188/134 |
| 5,655,636 A | * | 8/1997 | Lang et al. | 192/223 |
| 5,944,148 A | * | 8/1999 | Bae et al. | 188/134 |
| 6,202,803 B1 | * | 3/2001 | Lang | 188/134 |

* cited by examiner

Primary Examiner—Saul Rodriguez
(74) Attorney, Agent, or Firm—Stephen G. Mican

(57) ABSTRACT

A combined no-back and torque limiter device that automatically prevents back-drive and over-torque actuator conditions with a combination of two compression-type brakes that are selectively operated with a self-energised ball ramp set and torsional spring mechanism.

14 Claims, 12 Drawing Sheets

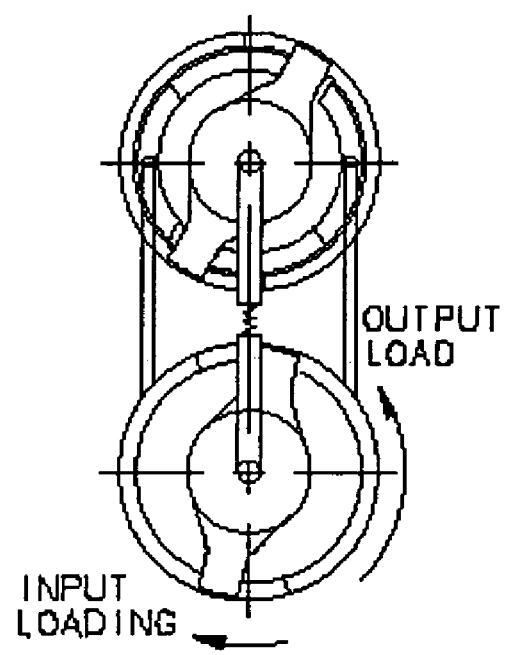
F I G . 11

COMBINED NO-BACK AND TORQUE LIMITER

FIELD OF THE INVENTION

The invention relates to actuation systems for aeronautical applications, and more particularly to no-backs and torque limiters for such actuation systems.

BACKGROUND OF THE INVENTION

Numerous aircraft actuation systems utilise geared rotary actuators that contain no-backs and torque limiters. A no-back provides the braking function needed to prevent air loads from back-driving an actuation system when no power is applied to the system. A torque limiter protects the actuator reduction gearing and the downstream aircraft structure by limiting the actuator output torque to a pre-defined value in the event of an overload or jam.

SUMMARY OF THE INVENTION

The invention combines both the no-back function and the torque limiter function into one mechanism with a combination of two compression-type brakes that are selectively operated with a self-energised ball ramp set and torsional spring mechanism. It is adaptable to any actuator design. The no-back, as well as the torque limiter, is self-energising; that is the resisting force is proportionally higher than the applied load. The combined no-back and torque limiter device according to the invention is simpler, has fewer parts, and requires less volume than separate no-backs and torque limiters.

In a preferred embodiment, the invention comprises a combined no-back and torque apparatus for limiting back-drive and limiting output torque of an actuator system, comprising: an input section that comprises a first set of rotational input section drive tangs coupled directly to an input drive shaft and a second set of rotational input drive tangs coupled to the input drive shaft through a preloaded torsional spring mechanism;

a pilot section coaxially mounted with the input section that comprises a set of rotational pilot section drive tangs that selectively engage the first set of rotational input section drive tangs, a first compression brake pack and a first ball ramp; and an output section coaxially mounted with the input and pilot sections that comprises a set of rotational output section drive tangs coupled to an output collar that selectively engage the second set of input section drive tangs, a second compression brake pack mounted adjacent to the first brake pack and a second ball ramp coupled to the first ball ramp by way of a set of ramp balls; wherein application of torque to the input shaft with an opposing load coupled to the output collar causes the first and second input section tangs to engage the pilot section tangs and output section tangs, respectively, to move the output collar; wherein application of torque to the input shaft with an aiding load coupled to the output collar the first set of input tangs contact the pilot section tangs to rotate the first brake pack and the first ball ramp relative to the second ball ramp to reduce compression between them sufficiently to permit the output collar to move under load; wherein application of a load to the output collar with no torque applied to the input shaft rotates the second ball ramp relative to the first ramp, thereby rolling the ramp balls between them to compress the first and second brake packs against each other sufficiently to stop further rotation of the output collar; and wherein application of torque to the input shaft that exceeds the preload of the spring mechanism causes the first set of input section tangs to rotate less than the second set of input section tangs, thereby causing the first ball ramp to rotate relative to the second ball ramp, thereby rolling the ramp balls between them to compress the first and second brake packs against each other sufficiently to stop further rotation of the output collar.

DESCRIPTION OF THE DRAWINGS

FIGS. 7 through 11 are illustrations of the positions of drive tangs in the combined no-back and torque limiter device for no load, holding load, aiding load, opposing load, and torque limiter engagement.

DETAILED DESCRIPTION OF THE INVENTION

Figure 1:
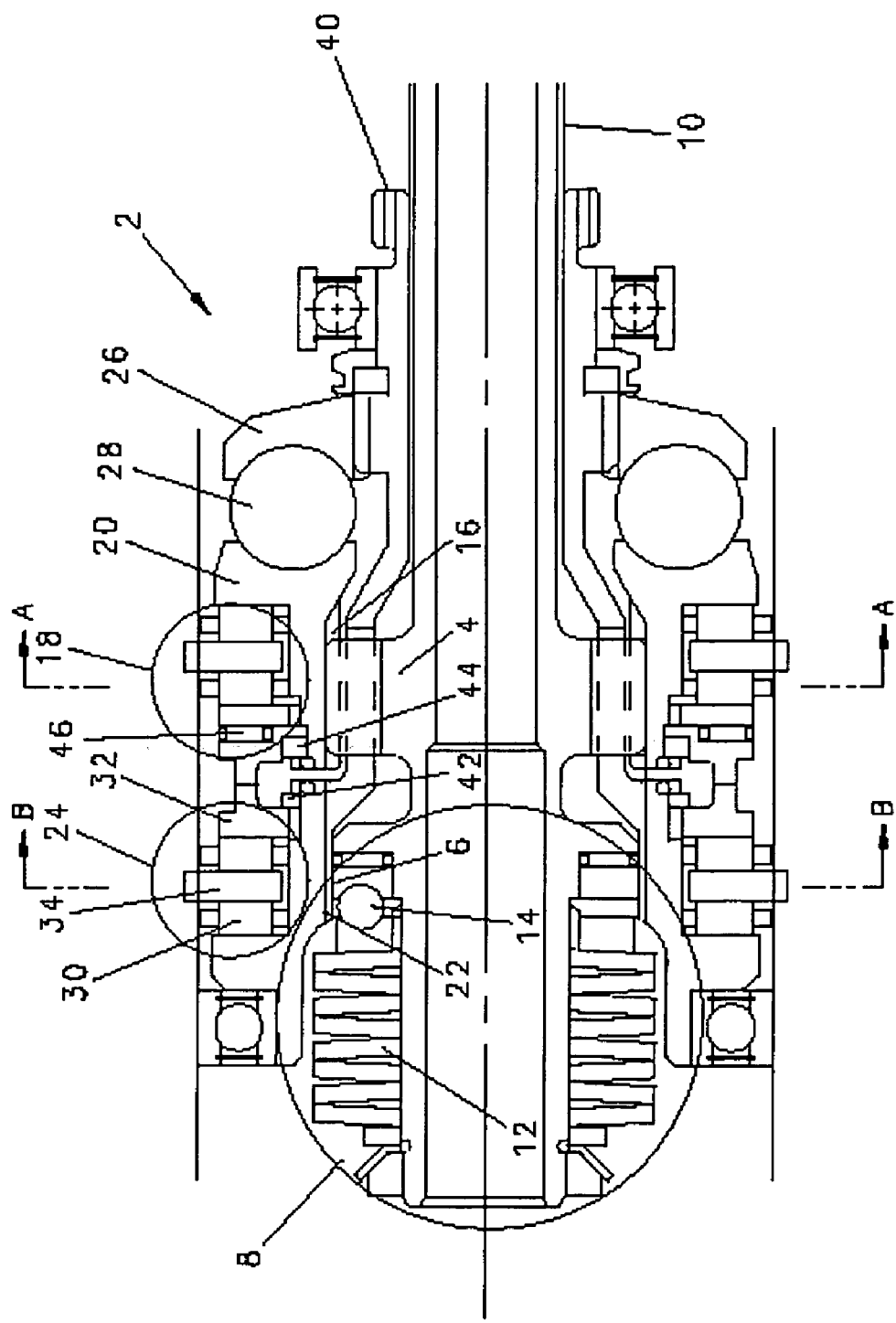
FIG. 1 shows a cut-away side view of a combined no-back and torque limiter device according to a preferred embodiment of the invention.

FIG. 1 shows a cut-away side view of a combination no-back and torque limiter device 2 according to a preferred embodiment of the invention. The combination no-back and torque limiter device 2 comprises an input section, pilot section, and an output section.

The input section comprises a first and second input section drive tangs 4 and 6 and a torsional spring mechanism 8 coupled to an input shaft 10. The first input section drive tangs 4 are coupled directly to the input shaft 10, whereas the second input section drive tangs 6 are coupled to the input shaft 10 through the torsional spring mechanism 8. The spring mechanism 8 conveniently comprises a Belleville spring stack 12 that preloads a small ball ramp set 14, although a torsional spring or other spring device could easily be used instead of the combination of Belleville spring stack 12 and ball ramp set 14.

The pilot section is coaxially arranged about the input section, and it comprises drive tangs 16, a first compression brake pack 18 and a self-energising first ball ramp 20. The output section is also coaxially arranged about the input section, and it comprises output section drive tangs 22, a second compression brake pack 24 and a self-energising second ball ramp 26 that couples to the first ball ramp 20 by way of ramp balls 28. Each brake pack 18, 24 comprises frictional elements 30 sandwiched between rotating plates 32 and stationary plates 34.

Figure 12:
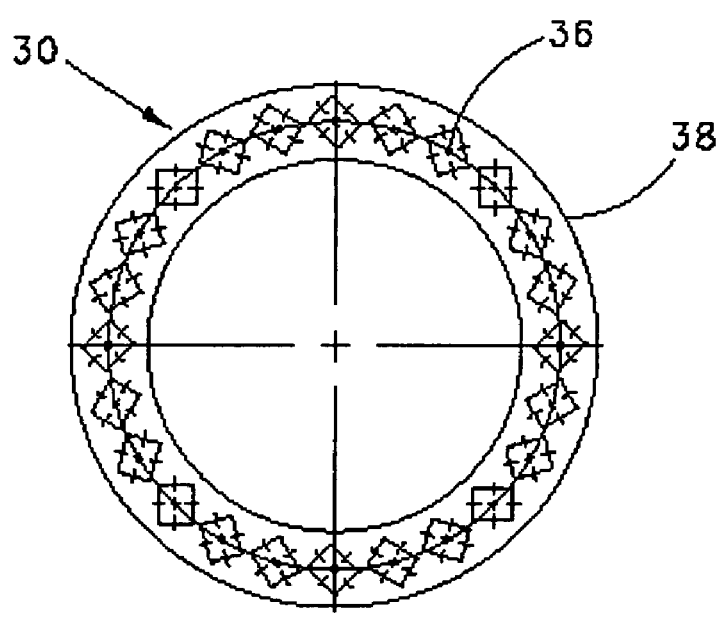
FIG. 12 shows a skewed roller type of frictional element that may be used in the combined no-back and torque limiter device according to a preferred embodiment of the invention.

Each frictional element 30 preferably comprises skewed rollers 36 mounted in a retainer 38 as shown in FIG. 12. These skewed rollers 36 have a narrow coefficient of friction band that promotes smooth no-back operation. The skewed rollers 36 are capable of sustaining high loads and should minimise any wear encountered during normal operation in the no-back mode. Other frictional materials may work effectively for the frictional elements 30 in place of the skewed rollers 36 if they meet the loading requirements of this design.

FIGS. 2 through 6 are linear schematics that describe the motion of the combined no-back and torque limiter device 2 according to a preferred embodiment of the invention. FIGS. 7 through 11 are illustrations of the positions of the drive tangs 4, 6, 16 and 22 for no load, holding load, aiding load, opposing load, and torque limiter engagement, as described in detail below.

No-Back Function

Figure 2:
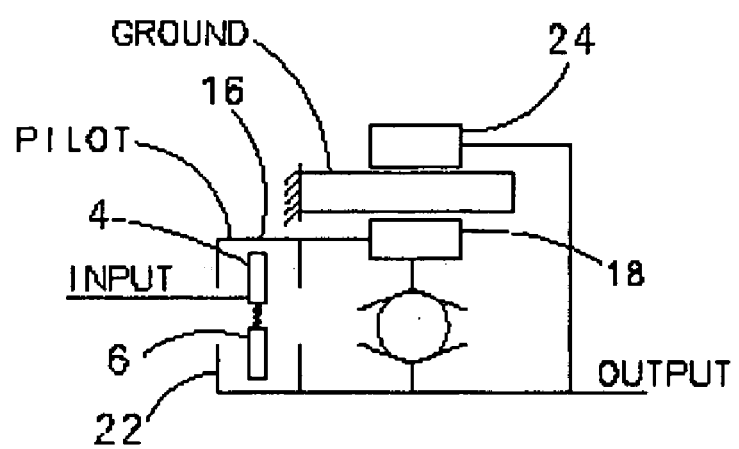
FIGS. 2 through 6 are linear schematics that describe the motion of the combined no-back and torque limiter device according to a preferred embodiment of the invention.
Figure 7:
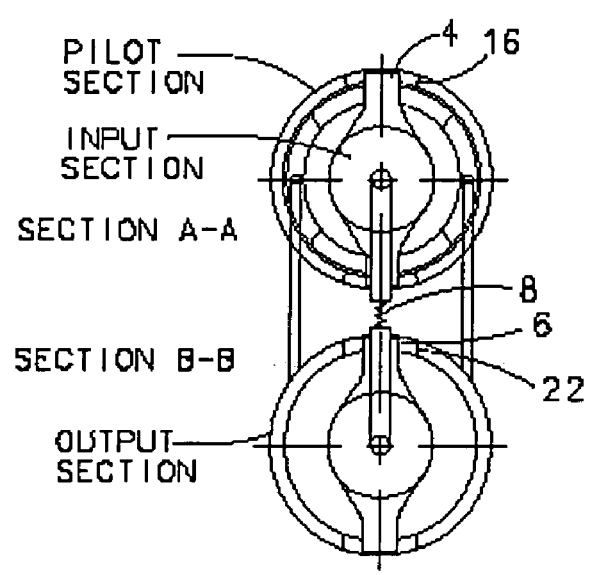

The combined no-back and torque limiter device 2 has an output collar 40 that is connected to the second ball ramp 26 and second brake pack 24. The second ball ramp 26 is connected to the first brake pack 18 by way of the balls 28 and the first ball ramp 20. Both brake packs 18 and 24 have a small amount of drag torque that is provided by compression springs 42 and 44, conveniently small, preloaded wave springs. With no load applied to the output collar 40, the first input section drive tangs 4 do not contact the pilot section drive tangs 16 and the second input section drive tangs 6 do not contact output section drive tangs 22, as illustrated in FIGS. 2 and 7.

Figure 3:
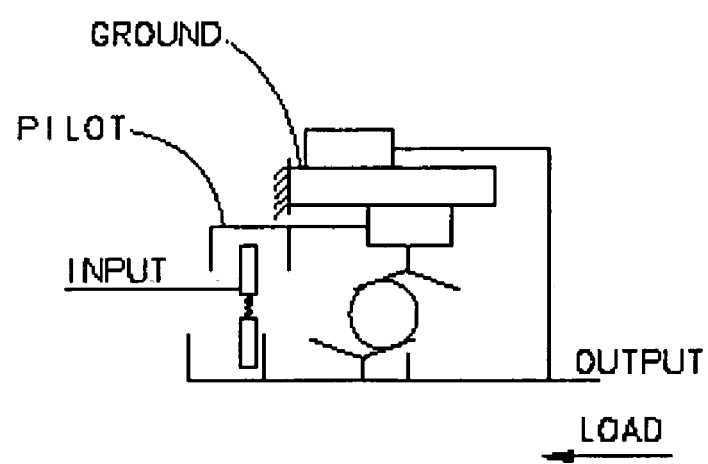
Figure 8:
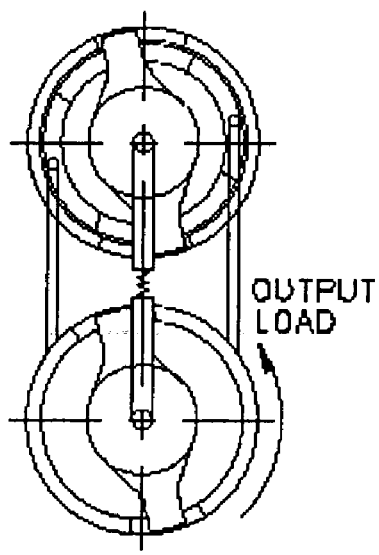

When an output load applied to the output collar 40 is sufficient to overcome the drag torque of the second brake pack 24, the motion of the output collar 40 rotates the second ball ramp 26. The small drag torque of first brake pack 18 prevents rotation of the first ball ramp 20. The rotational movement of the second ball ramp 26 relative to the first ball ramp 20 causes the balls 28 to roll and force the first ball ramp 20 axially to toward the second brake pack 24 such as to remove the clearance between the brake packs 18 and 24. Once the axial clearance between the brake packs 18 and 24 is removed, the resulting compression of the brake packs 18 and 24 cause them to exert sufficient force to prevent further rotation of the output collar 40 by the output load, since brake gain exceeds 1.0, as shown in FIGS. 3 and 8.

Figure 4:
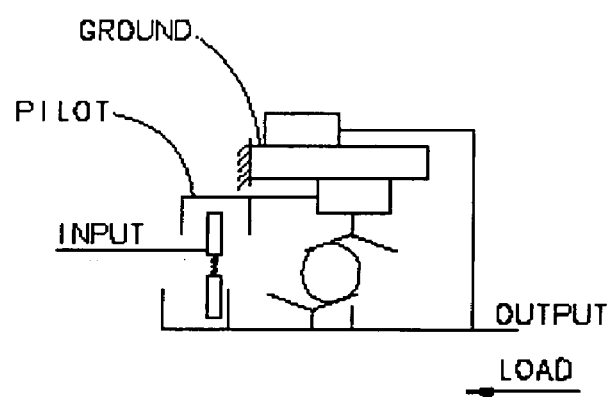
Figure 9:
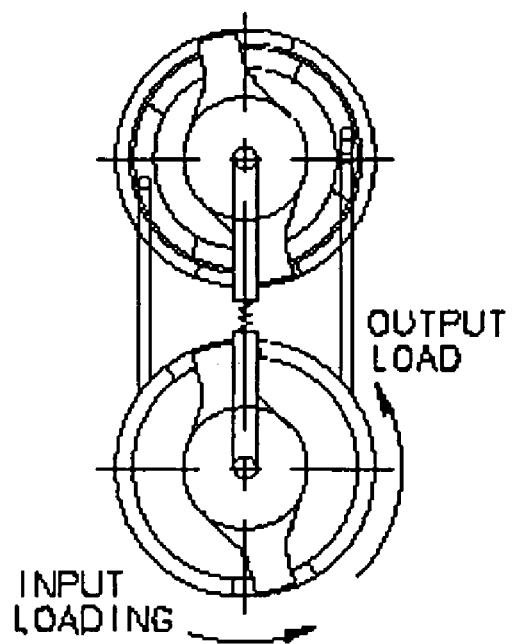

When an input force rotates the input shaft 10 whilst an aiding load is applied to the output collar 40, the first input section tangs 4 contact the pilot section tangs 16. The input section moves the first brake pack 18 and the first ball ramp 20 to allow the balls 28 to rotate such that axial clearance between the brake packs 18 and 24 increases. This reduces the compression of the brake packs 18 and 24, thereby decreasing their drag sufficiently to permit the output collar 40 to move under load, as shown in FIGS. 4 and 9.

Figure 5:
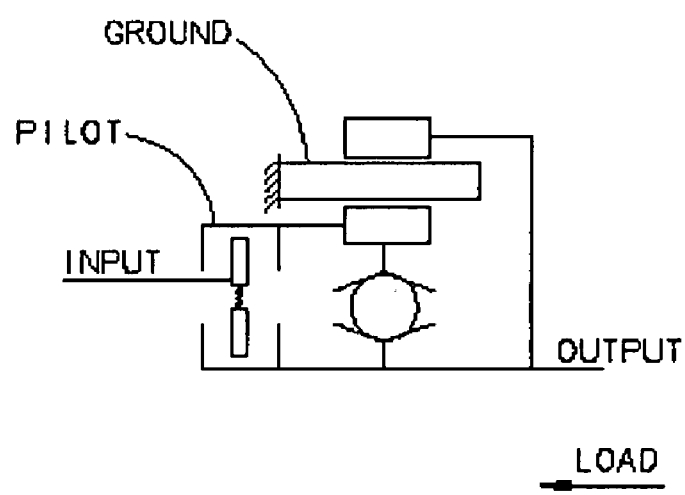
Figure 10:
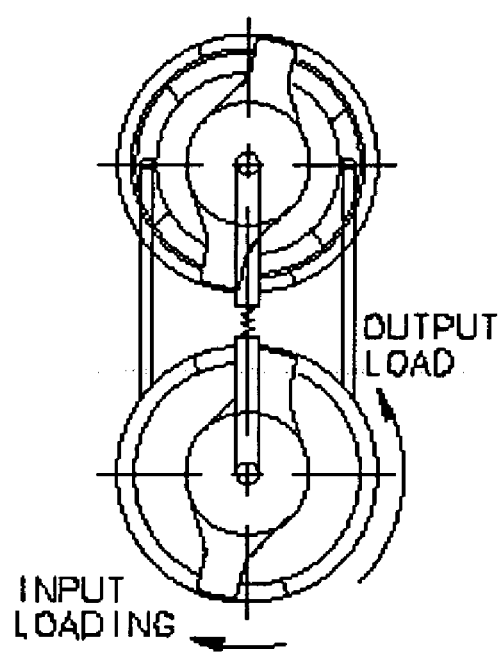

When an input force rotates the input shaft 10 whilst an opposing load is applied to the output collar 40, the second input section tangs 6 contact the output section tangs 22 to move the second brake pack 24 and the second ball ramp 26 to allow the balls 28 to rotate such that axial clearance between the brake packs 18 and 24 increases. This reduces the compression of the brake packs 18 and 24 sufficiently to remove the drag of the brake packs 18 and 24 except for the small drag torque provided by the spring sets 42 and 44. This allows direct rotation of the output collar 40, as shown in FIGS. 5 and 10.

Torque Limiter Function

Figure 6:
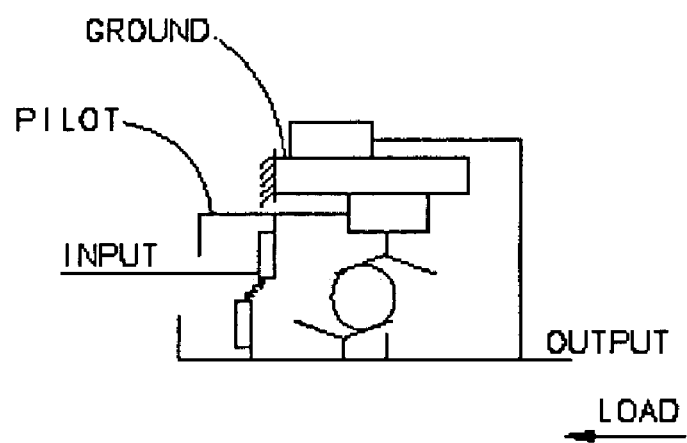

A torque limiter function is initiated if the combined no-back and torque limiter device 2 is driving an opposing load as described above in connection with FIGS. 5 and 10 and the input force applied to the input shaft 10 exceeds the preload of the Belleville spring stack 12 in the torsional spring mechanism 8. As a result, the ball ramp set 14 in the torsional spring mechanism 8 rotates the input section drive tangs 6 relatively less than the input section drive tangs 4, causing the rotational movement of the first ball ramp 20 relative to the second ball ramp 26. This difference in rotational movement of the ball ramps 20 and 26 causes the balls 28 to roll and force the first ball ramp 20 axially toward the second brake pack 24 such as to remove the clearance between the brake packs 18 and 24. The resulting compression of the brake packs 18 and 24 cause the brake packs 18 and 24 to exert sufficient force to prevent further rotation of the output collar 40 by the output load, as shown in FIGS. 6 and 11.

The force of the compressed brake packs 18 and 24 counteract any additional input loading above the preload of the torsional spring mechanism 8 to prevent transmission to the output collar 40. The preload of the torsional spring mechanism 8 would normally be set to the maximum operating load. Both brake packs 18 and 24 individually have gains greater than 1.0. A rolling bearing 46 positioned between the brake packs 18 and 24 ensures easy disengagement of the torque limiter function. Torque limiter release is accomplished by turning the input shaft 10 in the opposite direction.

Described above is a combined no-back and torque limiter device that automatically prevents back-drive and over-torque actuator conditions with a combination of two compression-type brakes that are selectively operated with a self-energised ball ramp set and torsional spring mechanism. It should be understood that this embodiment is only an illustrative implementation of the invention, that the various parts and arrangement thereof may be changed or substituted, and that the invention is only limited by the scope of the attached claims.

What is claimed is:

1. A combined no-back and torque apparatus for limiting back-drive and limiting output torque of an actuator system, comprising:

an input section that comprises a first set of rotational input section drive tangs coupled directly to an input drive shaft and a second set of rotational input drive tangs coupled to the input drive shaft through a preloaded torsional spring mechanism;

a pilot section coaxially mounted with the input section that comprises a set of rotational pilot section drive tangs that selectively engage the first set of rotational input section drive tangs, a first compression brake pack and a first ball ramp; and an output section coaxially mounted with the input and pilot sections that comprises a set of rotational output section drive tangs coupled to an output collar that selectively engage the second set of input section drive tangs, a second compression brake pack mounted adjacent to the first brake pack and a second ball ramp coupled to the first ball ramp by way of a set of ramp balls;

wherein application of torque to the input shaft with an opposing load coupled to the output collar causes the first and second input section tangs to engage the pilot section tangs and output section tangs, respectively, to move the output collar;

wherein application of torque to the input shaft with an aiding load coupled to the output collar the first set of input tangs contact the pilot section tangs to rotate the first brake pack and the first ball ramp relative to the second ball ramp to reduce compression between them sufficiently to permit the output collar to move under load;

wherein application of a load to the output collar with no torque applied to the input shaft rotates the second ball ramp relative to the first ramp, thereby rolling the ramp balls between them to compress the first and second brake packs against each other sufficiently to stop further rotation of the output collar; and wherein application of torque to the input shaft that exceeds the preload of the spring mechanism causes the first set of input section tangs to rotate less than the second set of input section tangs, thereby causing the first ball ramp to rotate relative to the second ball ramp, thereby rolling the ramp balls between them to compress the first and second brake packs against each other sufficiently to stop further rotation of the output collar.

2. The apparatus of claim 1, wherein the first and second compression break packs each comprise frictional elements sandwiched between rotating plates and stationary plates.

3. The apparatus of claim 2, wherein each frictional element comprises a plurality of skewed rollers mounted in a retainer.

4. The apparatus of claim 1, wherein the preloaded torsional spring system comprises a Belleville spring stack that preloads a ball ramp set.

5. The apparatus of claim 1, wherein the first and second brake packs have a small amount of drag torque provided by compression springs.

6. The apparatus of claim 5, wherein the compression springs comprise preloaded wave springs.

7. A combined no-back and torque apparatus for limiting back-drive and limiting output torque of an actuator system, comprising:
an input section that comprises a first set of rotational input section drive tangs coupled directly to an input drive shaft and a second set of rotational input drive tangs coupled to the input drive shaft through a preloaded torsional spring mechanism;
a pilot section coaxially mounted with the input section that comprises a set of rotational pilot section drive tangs that selectively engage the first set of rotational input section drive tangs, a first compression brake pack that comprises frictional elements sandwiched between rotating plates and stationary plates and a first ball ramp; and
an output section coaxially mounted with the input and pilot sections that comprises a set of rotational output section drive tangs coupled to an output collar that selectively engage the second set of input section drive tangs, a second compression brake pack that comprises frictional elements sandwiched between rotating plates and stationary plates mounted adjacent to the first brake pack and a second ball ramp coupled to the first ball ramp by way of a set of ramp balls;
wherein application of torque to the input shaft with an opposing load coupled to the output collar causes the first and second input section tangs to engage the pilot section tangs and output section tangs, respectively, to move the output collar;
wherein application of torque to the input shaft with an aiding load coupled to the output collar the first set of input tangs contact the pilot section tangs to rotate the first brake pack and the first ball ramp relative to the second ball ramp to reduce compression between them sufficiently to permit the output collar to move under load;
wherein application of a load to the output collar with no torque applied to the input shaft rotates the second ball ramp relative to the first ramp, thereby rolling the ramp balls between them to compress the first and second brake packs against each other sufficiently to stop further rotation of the output collar; and
wherein application of torque to the input shaft that exceeds the preload of the spring mechanism causes the first set of input section tangs to rotate less than the second set of input section tangs, thereby causing the first ball ramp to rotate relative to the second ball ramp, thereby rolling the ramp balls between them to compress the first and second brake packs against each other sufficiently to stop further rotation of the output collar.

8. The apparatus of claim 7, wherein each frictional element comprises a plurality of skewed rollers mounted in a retainer.

9. The apparatus of claim 8, wherein the preloaded torsional spring system comprises a Belleville spring stack that preloads a ball ramp set.

10. The apparatus of claim 7, wherein the first and second brake packs have a small amount of drag torque provided by compression springs.

11. The apparatus of claim 10, wherein the compression springs comprise preloaded wave springs.

12. A combined no-back and torque apparatus for limiting back-drive and limiting output torque of an actuator system, comprising:
an input section that comprises a first set of rotational input section drive tangs coupled directly to an input drive shaft and a second set of rotational input drive tangs coupled to the input drive shaft through a preloaded torsional spring mechanism;
a pilot section coaxially mounted with the input section that comprises a set of rotational pilot section drive tangs that selectively engage the first set of rotational input section drive tangs, a first compression brake pack that comprises frictional elements comprising skewed rollers mounted in a retainer sandwiched between rotating plates and stationary plates, a first ball ramp and a first compression spring to provide the first brake pack with a small drag torque; and
an output section coaxially mounted with the input and pilot sections that comprises a set of rotational output section drive tangs coupled to an output collar that selectively engage the second set of input section drive tangs, a second compression brake pack that comprises frictional elements comprising skewed rollers mounted in a retainer sandwiched between rotating plates and stationary plates mounted adjacent to the first brake pack, a second ball ramp coupled to the first ball ramp by way of a set of ramp balls and a second compression spring to provide the second brake pack with a small drag torque;
wherein application of torque to the input shaft with an opposing load coupled to the output collar causes the first and second input section tangs to engage the pilot section tangs and output section tangs, respectively, to move the output collar;
wherein application of torque to the input shaft with an aiding load coupled to the output collar the first set of input tangs contact the pilot section tangs to rotate the first brake pack and the first ball ramp relative to the second ball ramp to reduce compression between them sufficiently to permit the output collar to move under load;
wherein application of a load to the output collar with no torque applied to the input shaft rotates the second ball ramp relative to the first ramp, thereby rolling the ramp balls between them to compress the first and second brake packs against each other sufficiently to stop further rotation of the output collar; and
wherein application of torque to the input shaft that exceeds the preload of the spring mechanism causes the first set of input section tangs to rotate less than the second set of input section tangs, thereby causing the first ball ramp to rotate relative to the second ball ramp, thereby rolling the ramp balls between them to compress the first and second brake packs against each other sufficiently to stop further rotation of the output collar.

13. The apparatus of claim 12, wherein the preloaded torsional spring system comprises a Belleville spring stack that preloads a ball ramp set.

14. The apparatus of claim 12, wherein the compression springs comprise preloaded wave springs.

* * * * *